H. F. HAGEMEYER.
GLASSWARE RE-FORMING MECHANISM.
APPLICATION FILED OCT. 14, 1912.
1,107,935.
Patented Aug. 18, 1914.
9 SHEETS—SHEET 1.
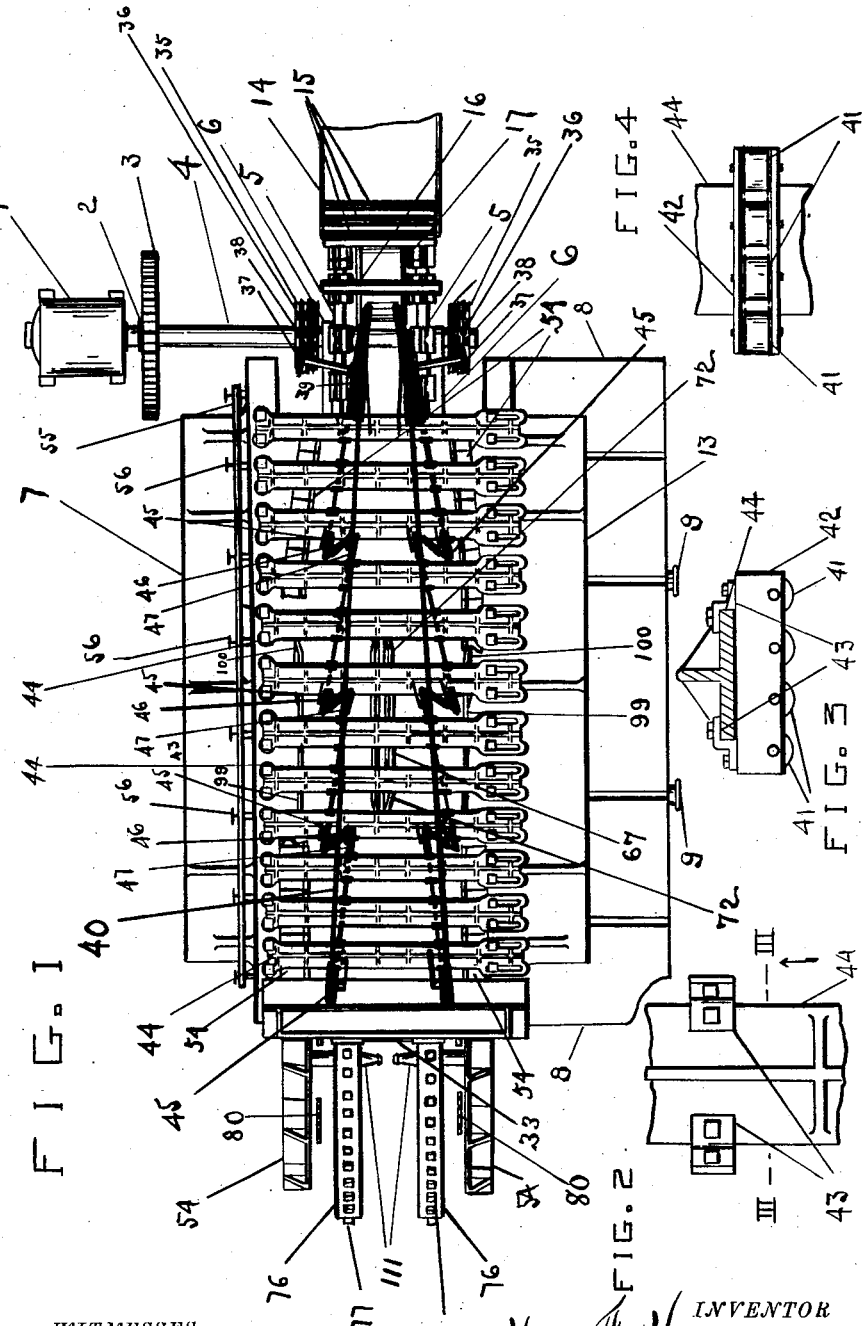
WITNESSES:
Gladys Jamrson
John M. Corl
INVENTOR
Henry F. Hagemeyer
BY
Geo. E. Kirk
ATTORNEY

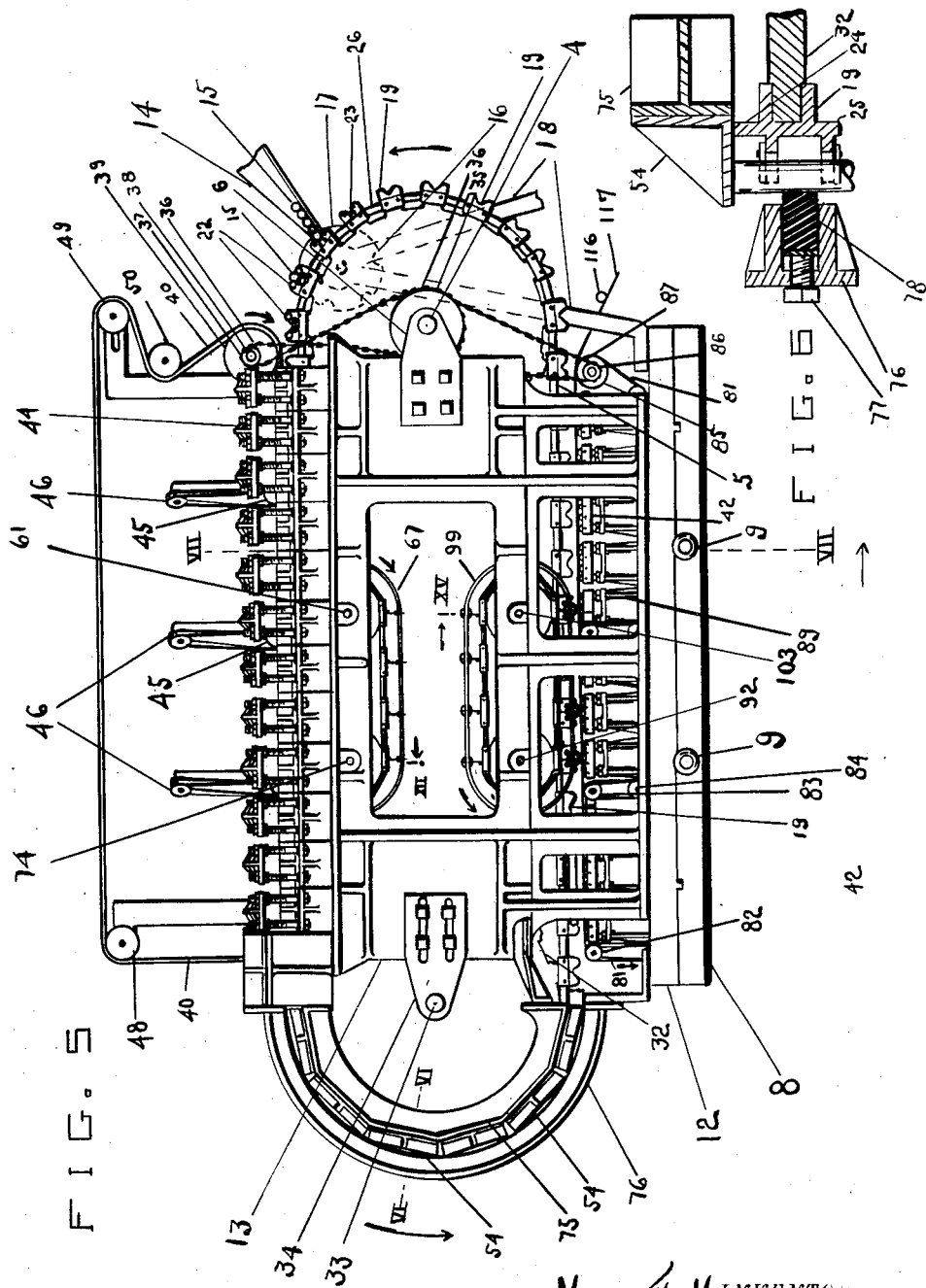

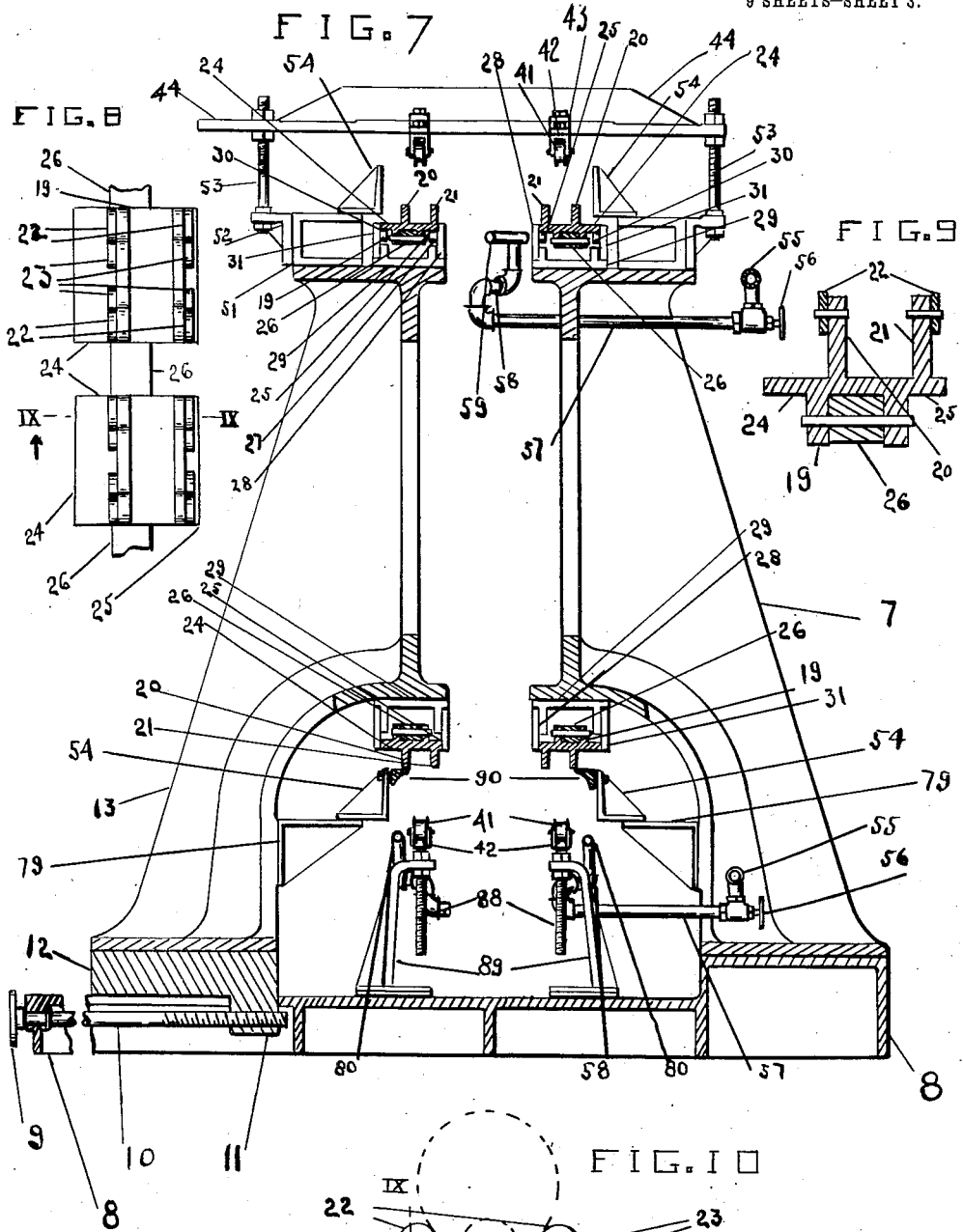

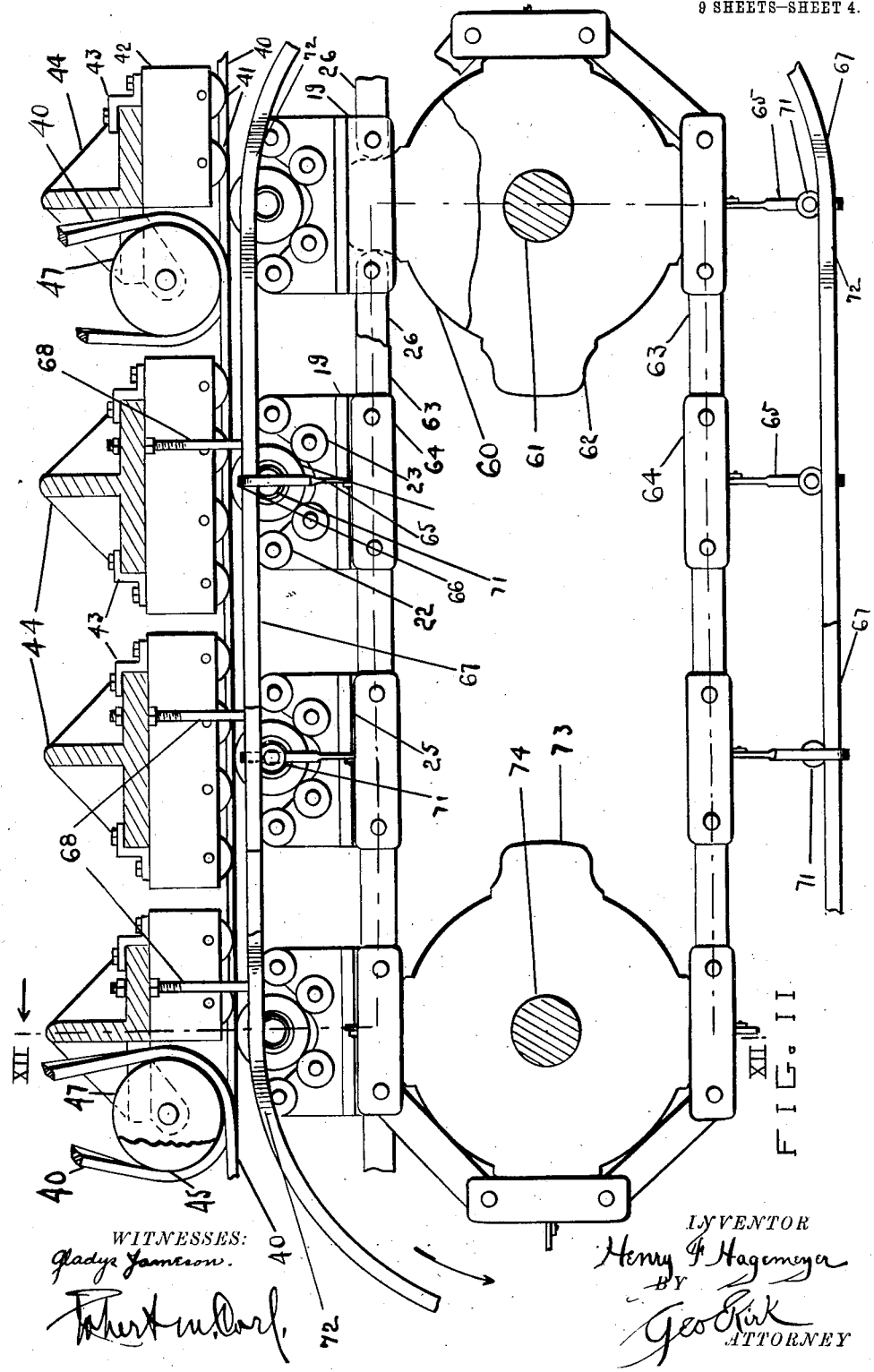

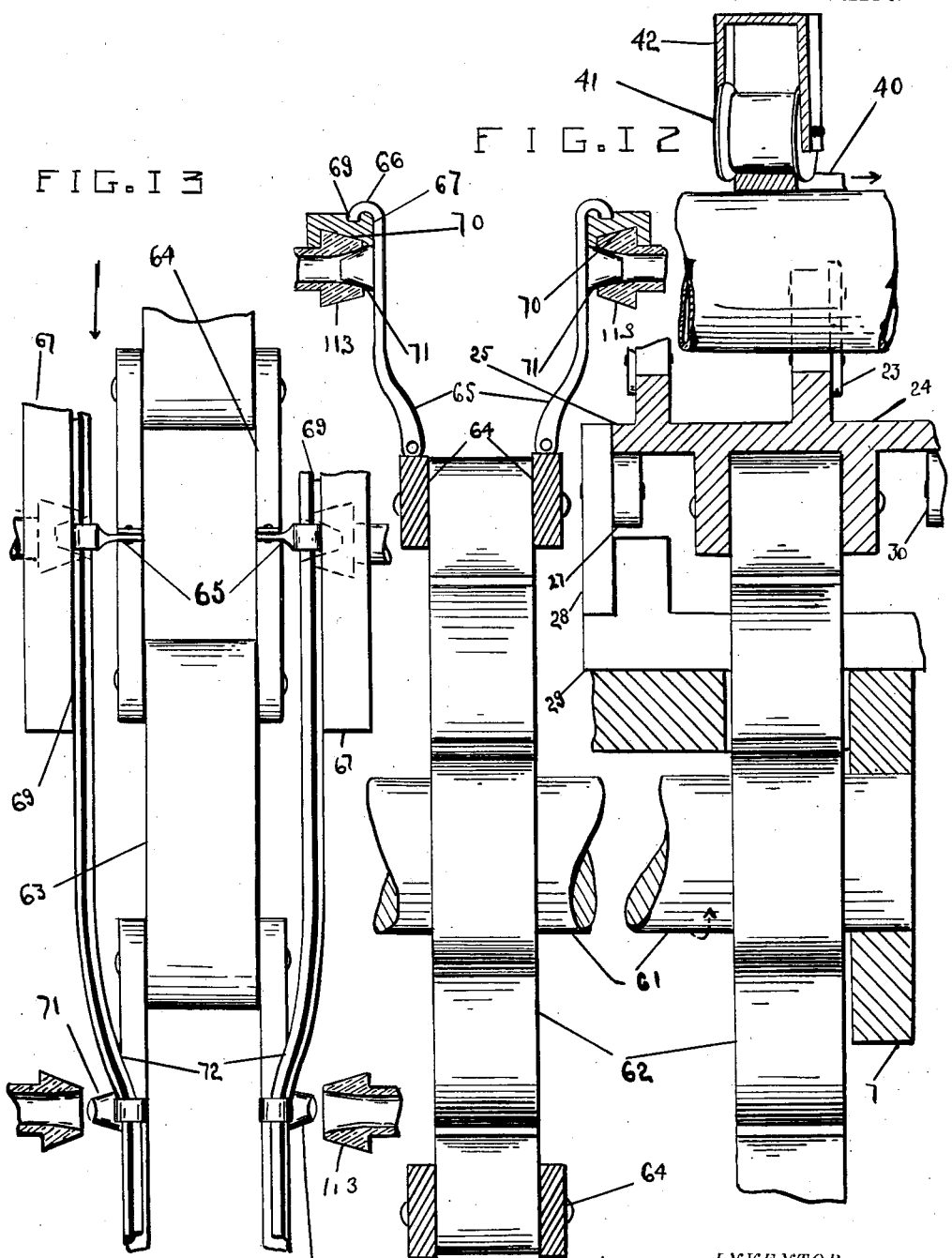

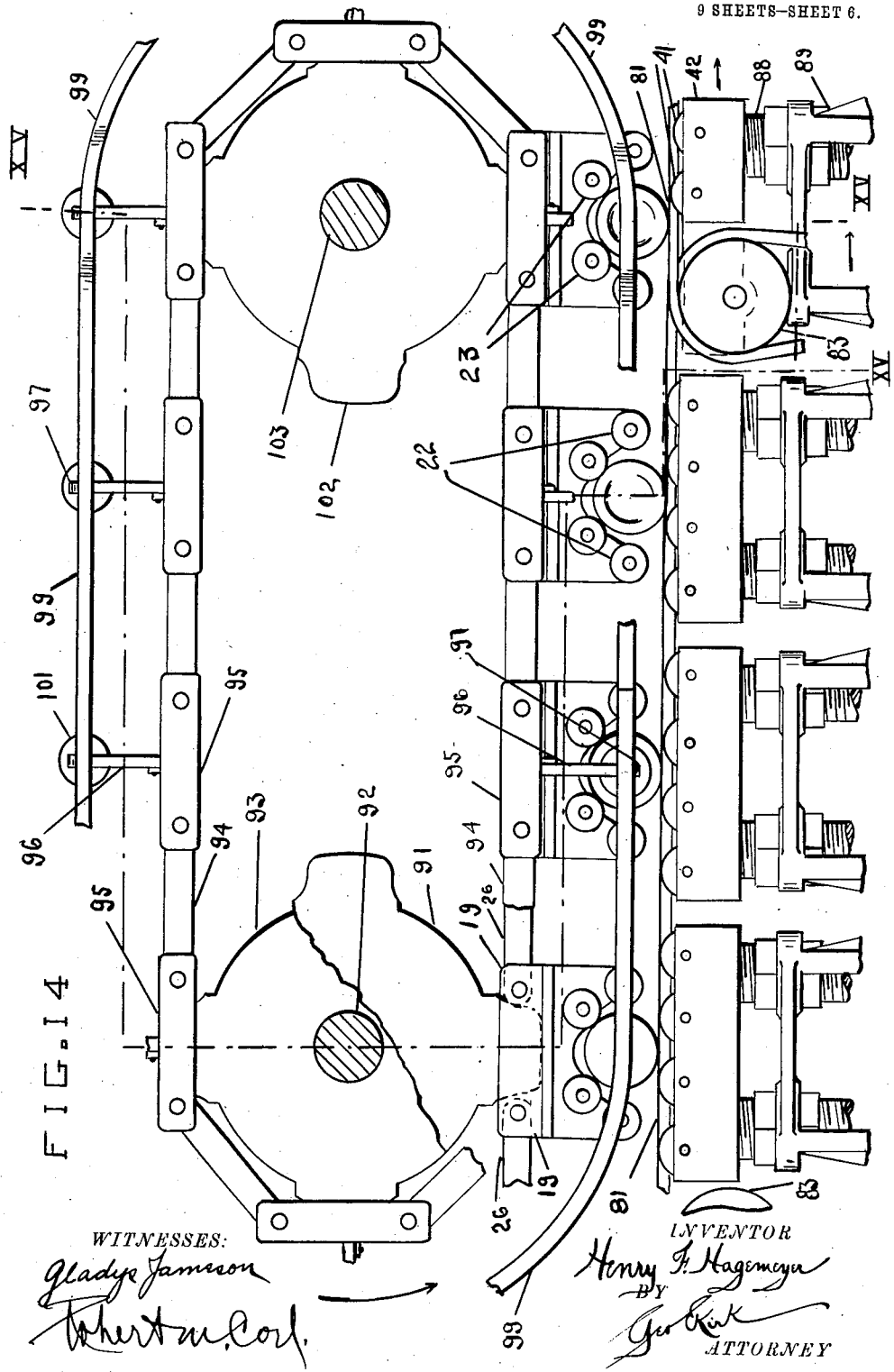

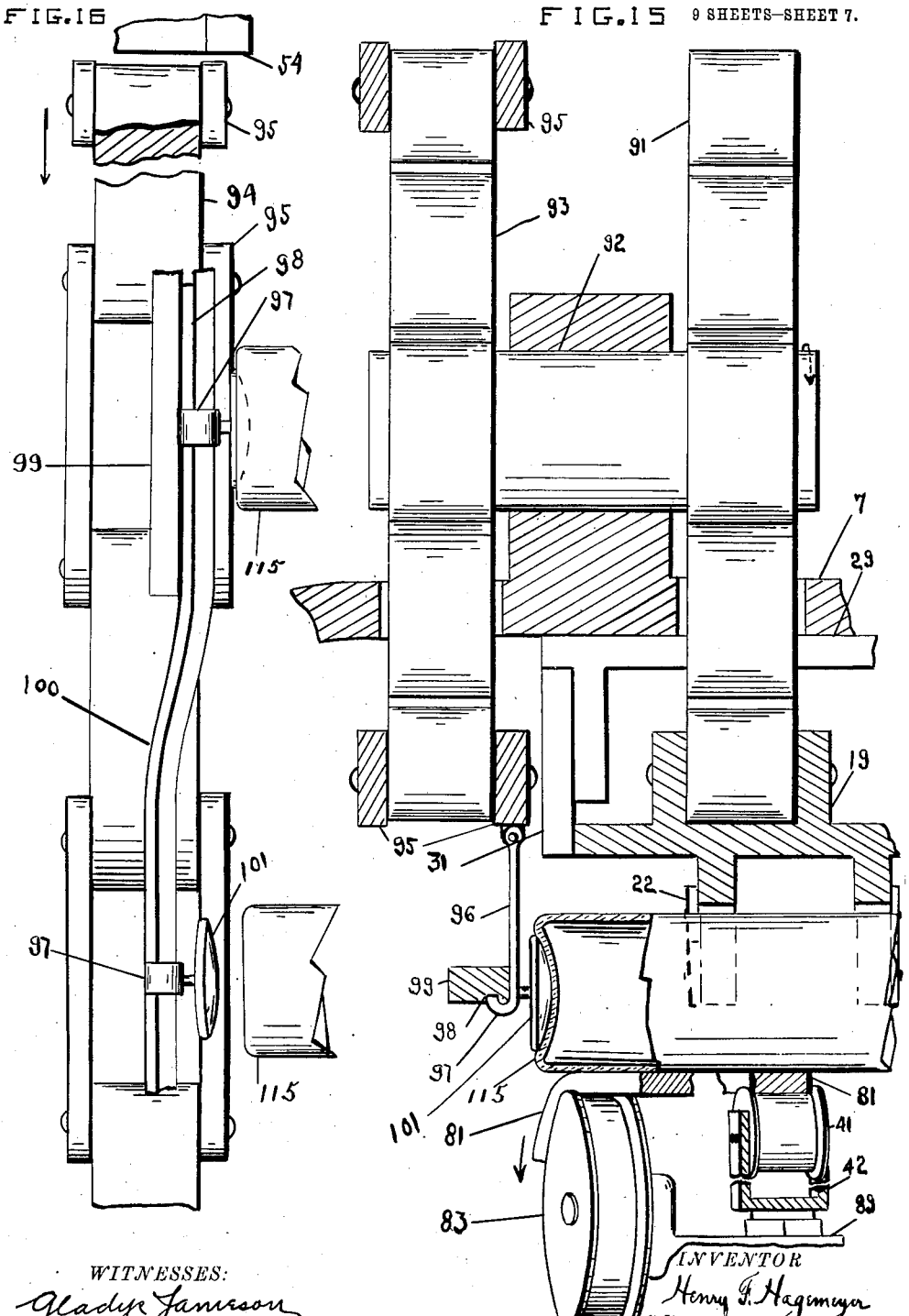

H. F. HAGEMEYER.
GLASSWARE RE-FORMING MECHANISM.
APPLICATION FILED OCT. 14, 1912.

1,107,935. Patented Aug. 18, 1914.
9 SHEETS—SHEET 8.

WITNESSES:
Gladys Jameson

INVENTOR
Henry F. Hagemeyer
BY Geo Kirk
ATTORNEY

H. F. HAGEMEYER.
GLASSWARE RE-FORMING MECHANISM.
APPLICATION FILED OCT. 14, 1912.

1,107,935.

Patented Aug. 18, 1914.

9 SHEETS—SHEET 9.

WITNESSES:
Gladys Jameson
Robert M Corl

INVENTOR
Henry F. Hagemeyer
BY Geo Kirk
ATTORNEY

UNITED STATES PATENT OFFICE.

HENRY F. HAGEMEYER, OF ROCKFORD, ILLINOIS, ASSIGNOR TO THE MECHANICAL PROCESS MANUFACTURING COMPANY, OF TOLEDO, OHIO, A CORPORATION OF OHIO.

GLASSWARE RE-FORMING MECHANISM.

1,107,935.

Specification of Letters Patent.

Patented Aug. 18, 1914.

Application filed October 14, 1912. Serial No. 725,624.

*To all whom it may concern:*

Be it known that I, HENRY F. HAGEMEYER, a citizen of the United States, residing at Rockford, Winnebago county, Illinois, have invented new and useful Glassware Re-Forming Mechanisms, of which the following is a specification.

This invention relates to the manufacture of articles, as glass, and the mechanism therefor.

This invention has utility when adopted in connection with the handling of tubular blanks, and particularly in the re-shaping of such blanks by causing them to flow to form.

Figure 17:
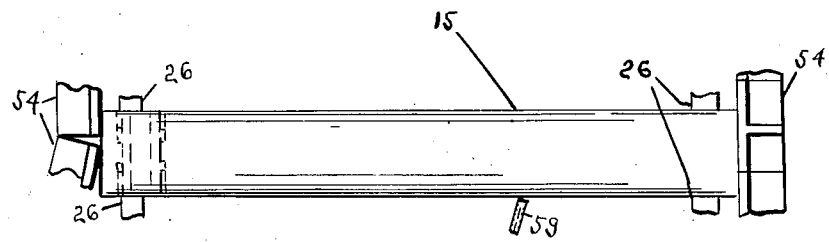
Figure 18:
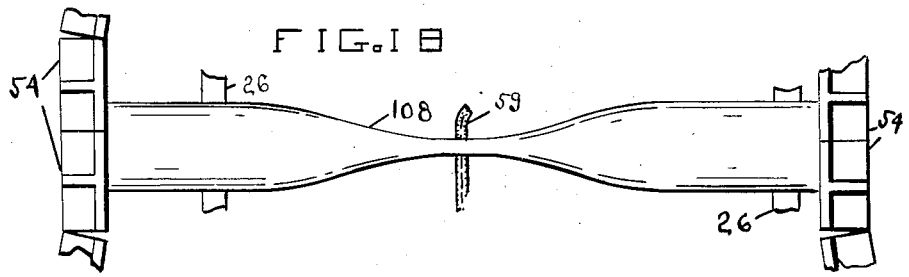
Figure 19:
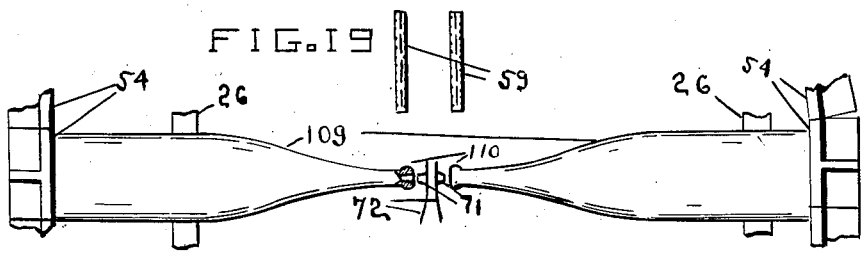
Figure 20:
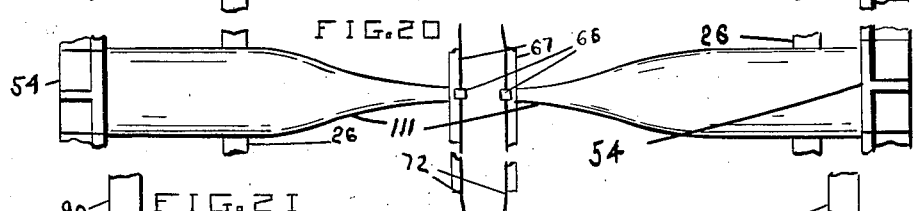
Figure 21:
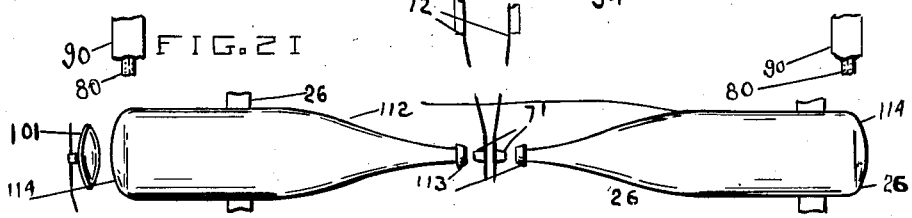
Figure 22:
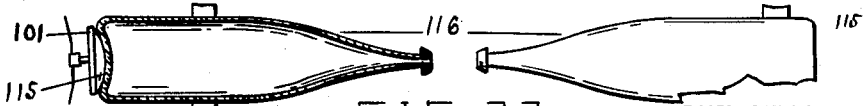
Figure 23:
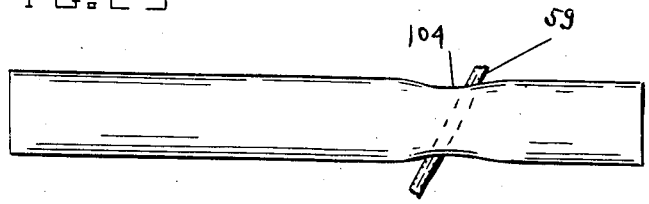
Figure 24:
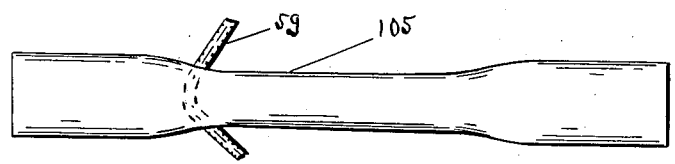
Figure 25:
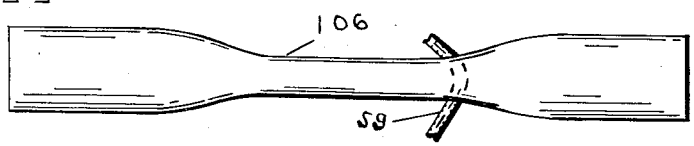
Figure 26:
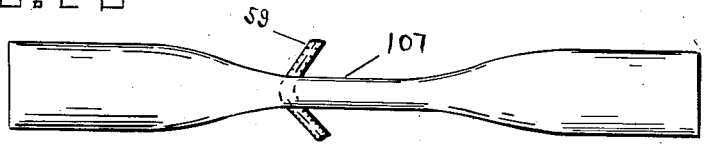
Figure 27:
Figure 29:
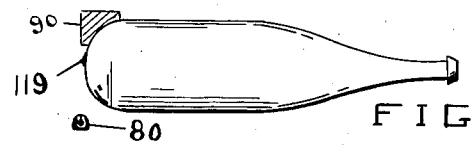
Figure 28:
Figure 30:
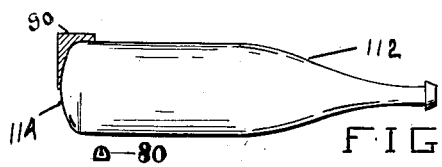
Figure 31:
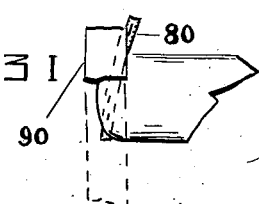

Referring to the drawings: Figure 1 is a fragmentary plan view of an embodiment of the invention in a mechanism adapted to manufacture bottles from tubular blanks; Fig. 2 is a fragmentary plan view on an enlarged scale of a portion of one of the bridge members; Fig. 3 is a section of the bridge member on the line III—III of Fig. 2, looking in the direction of the arrow; Fig. 4 is a bottom plan view of the bridge member of Fig. 2; Fig. 5 is a side elevation of the mechanism of Fig. 1; Fig. 6 is a section, on an enlarged scale, on the line VI—VI of Fig. 5 through one of the wheels only; Fig. 7 is a section of the mechanism on the line VII—VII of Fig. 5, looking in the direction of the arrow; Fig. 8 is a fragmentary plan view, on an enlarged scale of the ware holder conveyer chain; Fig. 9 is a section on the line IX—IX of Fig. 8, looking in the direction of the arrow; Fig. 10 is a fragmentary side elevation of the chain of Fig. 8; Fig. 11 is a fragmentary view of the forming mechanism for bottle necks embodied in the mechanism, and on an enlarged scale from the showing in Fig. 5; Fig. 12 is a section on the line XII—XII of Fig. 11, looking in the direction of the arrow; Fig. 13 is a fragmentary plan view of a portion of the bottle neck forming mechanism to the left in Fig. 11; Fig. 14 is a fragmentary side elevation of the forming mechanism for bottle bottoms embodied in the mechanism and on an enlarged scale from the showing in Fig. 5; Fig. 15 is a section corresponding to a section on the line XV—XV of Fig. 14, but of the device on the opposite side of the mechanism from the showing in Figs. 5 and 14; Fig. 16 is a fragmentary bottom plan view of the after portion of the device of Fig. 15; Fig. 17 is a fragmentary plan view of the blank as received by the mechanism for the first burner treatment; Fig. 18 is a view similar to Fig. 17 after the blank has been subjected to burner treatment and given neck taper in readiness for severing; Fig. 19 is a view of the next later stage with the severed tapered blanks ready for final neck forming; Fig. 20 is a view of the blanks at the neck forming stage; Fig. 21 is a view of the pair of opposing blanks with necks complete and the bottoms closed; Fig. 22 is a view of the blanks as finished with countersunk bottoms; Fig. 23 is a view of the blank as effected by local or zone burner treatment for flowing to form; Figs. 24, 25, 26, show further stages in this gradual flowing to form; Fig. 27 is a fragmentary showing of a flowing to form by one heat reduction, instead of a series of reductions as shown in Figs. 23 to 26 inclusive, which may progress along the blank and be graduated as desired; Fig. 28 is a fragmentary view of a blank, showing the flowing to close and sever; Fig. 29 is a view of a blank with bottom forming at the earlier stage; Fig. 30 is a view of bottom forming by shaping in from a former, or showing of a later stage from the view in Fig. 29; and Fig. 31 is a fragmentary view of the bottom forming or end closing, showing disposal of the burner to relieve the ware from cooling stresses.

The prime mover or motor 1 has on its shaft the pinion 2 in mesh with the gear wheel 3 on the shaft 4 carrying the sprocket wheels 5 mounted on the bearing brackets 6. One of the brackets 6, that on the side toward the motor 1, is mounted on the stationary mechanism frame 7. This frame 7 (Fig. 7) is mounted on the base 8. Hand wheels 9 rotatably mounted as to the base plate 8 and fixed on the screw rods 10 engaging lugs 11 of the auxiliary base 12, permit of ready adjustment of the opposing frame 13 on base 12 toward and from the frame 7 for varying the mechanism in adapting for ware of different lengths. This frame 13 opposing the frame 7, carries the other bracket 6.

Disposed adjacent the pair of sprocket wheels 5 (Figs. 1, 5) is the inclined chute 14 of the supply device down which the blanks 15 may roll to enter the notches 16 of the feed wheel 17 carried by the bearing brackets 18 in position between the sprocket wheels 5. The notches 16 of the feed wheel 17 are so disposed that when a tubular blank 15 rolls into the notch 16 and is engaged by the holder sprocket link 19, the travel of the link 19 takes with it the blank 15 and the feed wheel 17, the circular portion of the wheel 17 between the notches 16 preventing the feeding down of the following blank until the next notch 16 and the next link 19 reach the chute 14 simultaneously. In this manner the sprocket chain serves to automatically feed the blanks one at a time.

The links 19 (Figs 8, 9, 10) carry the pair of opposing V-flanges 20 and 21, each having pairs of anti-friction rollers 22, 23, so disposed as to give considerable range in the diameter of blanks which may be handled, as shown in dotted lines in Fig. 10. The holder link 19 is also provided with lateral flanges 24 and 25. Connecting the blank holder links 19 are the block links 26 of the sprocket chain forming the endless conveyer. Sustaining the flange 25 of the links 19 are the anti-friction rollers 27 (Fig. 7) carried by the guide blocks 28 mounted on the plates
29. Flanges 24 ride on anti-friction rollers 30 carried by the guide blocks 31 mounted on the opposite sides of plate 29 from the blocks 28. These anti-friction rollers serve to maintain the upper reaches of each of the sprocket chains in position, and notwithstanding pressure thereon, permit of travel with a minimum of resistance. These endless sprocket chains, each comprising the links 19, 26, in their travel in synchronism as driven from the sprocket wheels 5, travel along the anti-frictional supported upper reaches to the pair of sprocket wheels 32, similar to wheels 5. These sprocket wheels 32 are mounted on the shaft 33 carried by the brackets 34 mounted on the mechanism frames 13, 7. These brackets 34 (Fig. 5) are adjustable to place the sprocket chains under proper tension.

Mounted on the shaft 4 are the chain wheels 35 driving through the crossed chain 36 the chain pinions 37 on shafts 38 carrying the pulleys 39 actuating the endless belt 40 (Figs. 1, 5). The belt 40 (Figs. 3, 4, 11) is guided by the pressure rollers 41, which channeled pressure rollers are mounted in the bracket 42 mounted by the clips 43 on the bridge members 44. The belt 40 is shown in its travel to press against the blanks and move at a greater rate than the blanks travel to rotate the blanks in the holders. The inclination of the belt 40 to the direction of blank travel and toward the outer end of the blanks tends to actuate the blank outward when adjusted into contact therewith.
With the belt 40 driven oppositely to the direction of blank travel, a less speed of the belt is necessary to bring about the same rotative rate for the blank.

To give a maximum of longitudinal actuation to the blank the inclination of the belt 40 away from the center of the mechanism is divided into a plurality of reaches about the pulleys 45, 46, 47 (Figs. 1, 5). The upper reaches of these endless belts 40 extend from pulley 48, over the belt tightener pulley 49 and thence about pulley 50 for completing the circuits over the pulleys 39.

Mounted outside the plates 29 on the frames 7, 13, (Fig. 7) are the blocks 51 carrying the brackets 52 for the bolts 53 sustaining the bridge members 44. By the adjustment of the bolts 53 the pressure of the belt upon the blanks may be regulated or entirely removed, and adjustments made for blanks of varying diameters. The clips 43 permit adjustment of the line of the channel rollers 41 to the line of travel of the belt 40 in one direction for outward travel with the belt driven one way, and in the opposite direction when the belt is driven the other way. The pulleys for the belts 40 are carried by the bridge members 44. To limit the extent of the outward guiding or travel of the ends of the blanks, limiting means or blocks 54 are provided (Figs. 1, 5, 7).

For effecting the heating, fuel lines 55 are provided with a plurality of branches controlled by the valves 56 (Figs. 1, 7). The liquid or gaseous fuel passes through the lines 57 through the adjusting connections 58 to the burners 59. The adjusting connections permit such disposal and angular placing of the burners as may be desired in the particular operations to be performed, while the valves permit any desired nicety in regulation along the heaters.

Following the local heating centrally of the blanks in the portion of the apparatus shown at the top in Fig. 7, the blanks are ready for further treatment in the production of bottle necks by the bottle neck forming mechanism (Fig. 11). Meshing with one of the sprocket chains 19, 26 is the sprocket wheel 60 fast on the shaft 61 mounted in the frames 7, 13. Fixed to this shaft 61 and centrally between the frames 7, 13, is the sprocket wheel 62 having thereon the endless sprocket chain comprising the links 63, 64 driven by the wheels 60, 62, in synchronism with the sprocket chains 19, 26. The links 64 have pivoted one on each side thereof, the arms 65 (Figs. 12, 13), with the free end 66 thereof extending over the edge of the member 67. The member 67 is carried by the bolts 68 connected to the bridge members 44. The arm ends 66 engage in the groove 69 of the member 67. The under side of the upper portion of the member 67 has for a portion of its length a stationary neck former 70 in position to be contacted by the outside of the rotating traveling blank, while simultaneously the guide groove 69 causes the traveling plug or former 71 for the inside of the bottle neck to move into operative position. As this bottle forming operation is completed by the stationary and traveling formers 70 and 71, the stationary former 70 ends and the guide groove 69 is provided with the bends 72 at the points 72' in the member 67 serving to withdraw the plugs 71 from the ware as the ware continues its travel with the holders 19, while the endless chain 63, 64 passes about the sprocket wheel 73 on the shaft 74 mounted in the frames 7, 13, and returns to the wheel 62 for a repetition of these operations.

In the passing of the ware about the sprocket wheels 32, the end limiting blocks 54 are held by the bracket member 75 (Figs. 5, 6), while in the plane of the wheels 32 are disposed the members 76 with the screws 77 to adjust the yieldable or rubber blocks 78 as pressure blocks. These stationary pressure blocks 78 serve to rotate the traveling ware. Adjustment of these blocks 78 allows the same range of usefulness as the adjustment of the bridge members 44.

Brackets 79 (Fig. 7) carry the limiting blocks 54 along the lower reaches of the sprocket chains 19, 26. Burners 80, similar to burners 59, are disposed to heat the outer termini of the blanks. For rotating the blanks along the lower reaches of the sprocket chains 19, 26, endless belts 81 are shown (Fig. 5), as traveling against the line of travel of the ware, and accordingly disposed for inclination opposite to the showing of belts 40 (Fig. 1). These belts 81 travel over the pulleys 82, 83, 84, 85, in a similar manner to the arrangement with the belts 40. The pulleys 85 are mounted on the shafts with the chain pinions 86 driven by the chains 87 from chain wheels on shaft 4 just inside the chain wheels 35.

To sustain the blank rotating devices and effect their longitudinal actuation as determined by the limit blocks 54 or formers, are the anti-friction rollers 41 in brackets 42 such as hold the pressure belts 40 on the upper reaches. These channel rollers 41 are adjusted against the pressure belts 81 by the bolts 88 sustaining the brackets 42 (Fig. 7). These bolts 88 are carried by the standards 89 mounted on the base 8. These sectional burners 80 may so soften up the outer termini of the ware that action of the stationary formers 90, carried by the limit blocks 54, may serve to shape the ends inward for closing the bottoms of bottles.

With the bottoms of the bottles closed, the succeeding operation is the countersinking of the bottoms, which may be accomplished by the mechanism of Fig. 14. Meshing with the sprocket chain 19, 26 is the sprocket wheel 91 fast on the shaft 92 carried by the frames 7, 13. Also fixed on the shaft 92 is the sprocket wheel 93 connected to drive the sprocket chain 94, 95 in synchronism with the sprocket chains 19, 26. The links 95 are each provided with pivoted arms 96 (Figs. 14, 15) having their free ends 97 engage the groove 98 in the guide member 99. Bends 100 in the grooves 98 cause the arms 96 to withdraw the traveling formers 101 from seating position in the ware during its rotation and travel. This guide groove bends back at once after getting the formers 101 out of the ware, so that after the former carrying chain passes over the follower sprocket wheel 102 on the shaft 103 mounted in the mechanism frames 7, 13, the former is carried around for repetition of the forming operation, in which operation the pressure belts 81 actuate the ware toward the former, instead of the former being moved into the ware as shown by the plugs 71.

In the treatment of the ware, it is heated locally, as by controllable sectional burners 59, and rotated. This zone or local heating (Fig. 23) may flow the metal to the form of a restriction 104. In the manufacture of glass bottles of considerable neck taper, it may be found convenient to progress this taper to the length desired producing the restriction 105 (Fig. 24), and follow up by shorter extent restriction 106 (Fig. 25) and 107 (Fig. 26), until the metal is flowed to the desired neck taper. The limit blocks 54 may be so disposed as to permit such elongation by the pressure belt actuations either toward one side (Fig. 17) or both ways (Fig. 18) as will maintain the walls of the neck at uniform thickness or increase or decrease such thickness at the zone heated points as may be desired. From the desired neck taper (Fig. 18) the blanks 108 may be severed by central heating to produce the pair of blanks 109, and such heating may upset ends 110 for the lips of the bottle ends thus minimizing the necessary upsetting to be done by the action of the formers on the blanks 111 (Fig. 20).

With the formers withdrawn from the bottle necks, and the ware past the stationary formers, the blanks 112 have the lips 113 complete (Fig. 21). Simultaneously with this operation (Figs. 20, 21) or following, as shown in the mechanism of Fig. 1, the bottom forming may be brought about by heating the outer termini of the blanks and causing the stationary formers 90 to act thereon, thus rounding in the end 114 (Fig. 21), which is followed up by the traveling countersinking former 101, making the countersunk bottle bottom 115 (Fig. 22), when the completed ware in continuing its travel through the mechanism is discharged as finished bottles 116 on the chute 117.

The zone heating, instead of flowing the metal down in stages as shown in Figs. 23 to 26 inclusive, may flow at one operation to restriction 118 (Fig. 27) desired and progress said restriction even to graduating the taper thereto. The severing may be by burner control and produce closed end blanks 119 (Fig. 28). These blanks may be used in other operations, as for incandescent bulb work, or be shaped into bottles. In the closing or shaping of the ware by flowing to rather abrupt restrictions, it is desirable to utilize the local heating for internal stress relief by ending such heating approximately at the corner, as shown in Fig. 31. In the relative travel of the heated region along the blanks herein, the cooling of the warmed portion has its stresses readily pass to the adjacent later warmed region, and thus the stresses may be lead entirely out of the ware avoiding necessity for annealing. Furthermore, the shaping herein, is a flowing to form, assisted at times only by formers other than the heating operation. At slow rotations, the heating tends to assist cohesion and the mass thickens. To regulate the gage of the walls of the article, there may be elongation of the article for thinning or contraction for thickening. At higher rotative speeds, centripetal acceleration tends to draw or throw the walls outward to reduce their thickness. The ware accordingly has a maximum of strength, may be produced with predetermined uniformity throughout, each article of a uniformly high grade in every respect.

What is claimed and it is desired to secure by Letters Patent is:

1. Forming means for an article of ware including a long narrow burner capable of producing a thin sheet of flame, a holder for the ware and mechanism effecting relative movement of the ware longitudinally of the burner in a plane approximately at right angles to the plane of the flame.

2. Forming means for an article of ware including a long narrow burner capable of producing a thin sheet of flame, a holder for the ware, means for rotating the ware, and driving mechanism effecting relative movement of the ware longitudinally of the burner in a plane approximately at right angles to the plane of the flame.

3. Forming means for an article of ware including a long narrow burner capable of producing a thin sheet of flame, an endless conveyer for carrying a succession of articles of ware adjacent said burner, and driving mechanism for the conveyer effecting movement of the ware longitudinally of the burner and approximately at right angles to the plane of the flame.

4. Forming means for an article of ware including a long narrow burner capable of producing a thin sheet of flame, ware holder means coacting with the ware at spaced points between which points the burner may act, and driving mechanism effecting a drawing away of the portions of the ware from each other on opposite sides of the burner and effecting relative movement of the ware longitudinally of the burner and approximately at right angles to the plane of the flame.

5. Forming means for an article of ware including a long narrow burner capable of producing a thin sheet of flame to act upon the ware, a ware holder engaging the ware on opposite sides of the flame, said burner effecting a weakened intermediate portion in said ware, driving mechanism to effect an extension of the ware at the heated weakened portion and effecting relative movement of the ware longitudinally of the burner and approximately at right angles to the plane of the flame, and means for positioning the ware as to the burner for continued action of the flame on the ware after the extension of the ware.

6. Forming means for an article of ware including a long narrow burner capable of producing a thin sheet of flame, a ware holder, means relatively movable as to said ware for rotating said ware in said holder, means for determining the position of the ware transversely of said holder, and driving mechanism effecting relative movement of the ware longitudinally of the burner in a plane approximately at right angles to the plane of the flame whereby the burner may act on the positioned ware.

7. Forming means for an article of ware comprising a ware holder disposed to engage one side of the ware and means opposing said holder for directly contacting the ware and relatively movable as to the ware rotating the ware relatively to the holder while the ware is held by the holder.

8. Forming means for an article of ware comprising a ware holder disposed to engage one side of the ware, driving mechanism for causing said holder to have a line of travel, and means for acutating the ware transversely of the line of travel of the holder, said means opposing said holder and directly contacting the ware and forcing the ware against the holder to rotate the ware relatively to the holder.

9. Forming means for an article of ware comprising a conveyer disposed to engage one side of the ware, driving mechanism for the conveyer, and a pressure device opposing said conveyer and directly contacting the ware to cause movement of the ware relatively to the conveyer while the ware is in the conveyer.

10. Forming means for an article of ware including a long narrow burner capable of producing a thin sheet of flame, a holder for the ware, and ware guiding driving mechanisms effecting rotation of the ware as to said holder, and relative movement of the ware longitudinally of the burner in a plane approximately at right angles to the plane of the flame.

11. Forming means for an article of ware comprising heating and forming mechanisms for reshaping a portion of the ware, local strain relieving heating means, and means for relatively bringing an article of ware from the heating and forming mechanisms to the local strain relieving heating means for locally heating the formed ware to remove strains arising therein from the forming.

12. Forming means for an article of ware including a long narrow burner capable of producing a thin sheet of flame, a continuously traveling holder for the ware, driving mechanism effecting rotation of the ware above said burner and relative movement of the ware longitudinally of the burner in a plane approximately at right angles to the plane of the flame, and guiding means for the ware to effect relative movement between the ware and burner toward and from a terminus of the ware.

13. Forming means for an article of ware including a long narrow burner capable of producing a thin sheet of flame, a holder for the ware, means for adjusting the burner toward and from the held ware, and mechanism effecting relative movement of the ware longitudinally of the burner in a plane approximately at right angles to the plane of the flame.

14. Forming means for an article of ware comprising an endless conveyer having holding means disposed to engage one side of the ware, driving mechanism for the conveyer, and a pressure bar opposing the conveyer and directly engaging the ware to rotate the ware relatively to the holding means.

15. Forming means for an article of ware comprising a holder disposed to engage one side of the ware, a heating device, driving mechanism effecting relative movement between the heating device and holder, a member for directly engaging the ware to actuate the ware relatively to the holder and actuating means for the member.

16. Forming means for an article of ware comprising an endless conveyer having ware holding means, driving mechanism for the conveyer, a belt opposing the conveyer for engaging the ware to rotate the ware relatively to said holding means, and actuating means for the belt.

17. Forming means for an article of ware comprising a traveling ware holder, a device opposing said holder and directly contacting the ware to rotate the ware as to said holder, mechanism for actuating the ware relatively to the holder transversely of the travel of the holder, and limiting means for determining the extent of the transverse actuation of the ware.

18. Forming means for an article of ware comprising a holder for the ware, a ware engaging belt opposed to said holder to co-act with the holder in gripping the ware to rotate the ware relatively to the holder and move the ware relatively transversely of the holder and driving means to actuate the belt.

19. Forming means for an article of ware comprising a conveyer for holding the ware and means for rotating the ware including a belt opposing the conveyer and directly contacting the ware, actuating means for the belt, and means for adjusting the belt relatively to the held ware.

20. Forming means for ware comprising a traveling holder for the ware, a device for rotating the ware as to the holder, a heater for the ware, and stationary forming means for shaping the heated traveling rotating ware.

21. Forming means for ware comprising a traveling holder for the ware, a device for rotating the ware during its travel, and a heater disposed at an angle to the travel of the ware to thereby extend along the ware.

22. Bottle forming means including a traveling blank holder, a device for rotating the blank as to the traveling holder, and a form changer including a long narrow burner capable of producing a thin sheet of flame for acting upon a portion of the blank away from the device, said holder in its travel carrying the blank longitudinally of the burner in a plane approximately at right angles to the plane of the flame.

23. Forming means for ware comprising a traveling holder for the ware, a device opposing said holder and directly contacting the ware for rotating the ware relatively to said holder during holder travel, a heater for a portion of the ware, a former for the heated portion of the ware and driving means for the former to cause it to travel in synchronism with the ware.

24. Forming means for ware comprising a traveling holder for the ware, transverse actuating mechanism for the ware opposing the holder and directly contacting the ware for moving the ware relatively to said holder during holder travel, a heater for a terminus of the ware, and a traveling former in operative relation to which the mechanism actuates the heated ware terminus.

25. Forming means for ware comprising a traveling holder for the ware, mechanism opposing the holder and directly contacting the ware for rotating the ware relatively to said holder, a heater for a terminus of the ware, a traveling former for the heated ware terminus, and a device for moving the former into operative relation with the heated ware terminus.

26. Forming means for ware comprising an endless conveyer for the ware, a device opposing said conveyer and directly contacting the ware for rotating the ware relatively to the conveyer, driving means for the conveyer, a long narrow heater longitudinally of which the conveyer carries the ware in a plane approximately at right angles to the plane of the heater for heating a portion of the ware, and a stationary former for the heated ware portion.

27. Forming means for a blank having a cylindrical intermediate portion, said means comprising a holder for said cylindrical intermediate portion, rotation mechanism opposing the holder and directly contacting the cylindrical portion, a blank form changer disposed for changing the shape of the blank, said form changer including a long narrow burner capable of producing a thin sheet of flame, and driving mechanism for effecting relative movement of the blank longitudinally of the burner in a plane approximately at right angles to the plane of the flame.

28. Forming means for ware comprising a blank, a holder for the blank, a device opposing said holder for moving said blank relatively to the holder, heating means for said blank, a stationary former, a former traveling in synchronism with said holder, and driving means for the holder to carry the ware past the heating means, past the stationary former and with the traveling former.

29. Forming means for an article of ware comprising an endless conveyer having holding means disposed to engage one side of the ware, driving mechanism for the conveyer, a pressure bar opposing one portion of the conveyer and directly engaging the ware to rotate the ware relatively to the holding means, and a belt opposing another portion of the conveyer for engaging the ware to rotate the ware relatively to said holding means, and actuating means for the belt.

In testimony whereof I affix my signature in the presence of two witnesses.

HENRY F. HAGEMEYER.

Witnesses:
F. L. BAUNGARDNER,
FRANCIS J. BULASK.